United States Patent
Unno

(10) Patent No.: US 7,554,217 B2
(45) Date of Patent: Jun. 30, 2009

(54) VEHICLE CONTROLLER FOR A STRADDLE TYPE VEHICLE

(75) Inventor: Hitoshi Unno, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 374 days.

(21) Appl. No.: 11/419,395

(22) Filed: May 19, 2006

(65) Prior Publication Data

US 2006/0261674 A1    Nov. 23, 2006

(30) Foreign Application Priority Data

May 20, 2005    (JP) ............... 2005-148594

(51) Int. Cl.
*B60L 1/00* (2006.01)
(52) U.S. Cl. ................. 307/9.1; 340/426.1
(58) Field of Classification Search ................. 307/9.1, 307/10.1; 340/426.1
See application file for complete search history.

(56) References Cited

U.S. PATENT DOCUMENTS

| | | |
|---|---|---|
| 4,853,504 A | 8/1989 | Tanaka et al. |
| 4,941,854 A | 7/1990 | Takahashi et al. |
| 5,319,698 A | 6/1994 | Glidewell et al. |
| 5,343,077 A | 8/1994 | Yoshida et al. |
| 5,593,330 A | 1/1997 | Kobayashi |
| 5,623,245 A | 4/1997 | Gilmore |
| 5,725,228 A | 3/1998 | Livingston |
| 5,854,736 A | 12/1998 | Fuhs et al. |
| 5,860,842 A | 1/1999 | Parr |
| 5,965,955 A | 10/1999 | Takanohashi et al. |
| 6,077,133 A | 6/2000 | Kojima et al. |
| 6,125,782 A | 10/2000 | Takashima et al. |
| 6,352,045 B1 | 3/2002 | Takashima |
| 6,404,071 B1 | 6/2002 | Kurano |
| 6,695,657 B2 | 2/2004 | Hattori |
| 6,878,019 B2 | 4/2005 | Kanno et al. |
| 6,889,654 B2 | 5/2005 | Ito |
| 7,049,931 B2 | 5/2006 | Hayashi et al. |
| 2002/0053310 A1 | 5/2002 | Ibata et al. |
| 2003/0089291 A1 | 5/2003 | Kanno et al. |

(Continued)

FOREIGN PATENT DOCUMENTS

DE    10125064 A1    11/2002

(Continued)

OTHER PUBLICATIONS

Photograph of Saftey Lanyard Cap and Float from 2001 Seadoo RXD1.

(Continued)

*Primary Examiner*—Albert W Paladini
*Assistant Examiner*—Daniel Cavallari
(74) *Attorney, Agent, or Firm*—Knobbe, Martens, Olson & Bear, LLP

(57) ABSTRACT

In response to a request signal transmitted from the vehicle through operation of an activating switch, a portable device sends a code signal. The code signal is identified by a code identification component. If authentication of the code signal is successful, a control unit issues a release signal to unlock a steering lock and power is supplied from the control unit to an engine ECU so that the engine can be started.

7 Claims, 5 Drawing Sheets

U.S. PATENT DOCUMENTS

| | | | |
|---|---|---|---|
| 2004/0124033 A1* | 7/2004 | Lawson, Jr. | 180/312 |
| 2004/0164850 A1 | 8/2004 | Konno et al. | |
| 2004/0198106 A1 | 10/2004 | Tsumiyama et al. | |
| 2004/0217897 A1 | 11/2004 | Hayashi et al. | |
| 2004/0252014 A1 | 12/2004 | Emmerling et al. | |
| 2005/0012590 A1 | 1/2005 | Metlitzky et al. | |
| 2005/0029871 A1 | 2/2005 | Mori et al. | |
| 2005/0234601 A1 | 10/2005 | Suzuki | |
| 2005/0242929 A1* | 11/2005 | Onishi et al. | 340/426.17 |
| 2006/0087177 A1* | 4/2006 | Hata | 307/10.1 |
| 2006/0152348 A1* | 7/2006 | Ohtaki et al. | 340/426.1 |
| 2006/0261673 A1 | 11/2006 | Unno | |
| 2006/0261675 A1 | 11/2006 | Unno | |

FOREIGN PATENT DOCUMENTS

| | | | |
|---|---|---|---|
| DE | 10203462 A1 | 7/2003 | |
| EP | 1 069 012 A2 | 1/2001 | |
| EP | 1108631 A | 6/2001 | |
| EP | 1232918 A | 8/2002 | |
| EP | 150496 A | 2/2005 | |
| EP | 1547912 A | 6/2005 | |
| JP | 03021575 | 1/1991 | |
| JP | 06247260 | 6/1994 | |
| JP | 2001-254549 | 9/2001 | |
| WO | 2005042317 A1 | 5/2005 | |
| WO | WO 2005042317 A1 * | 5/2005 | |

OTHER PUBLICATIONS

SeaDoo 2003 shop Manual; pp. 1-7; @Bombardier Inc. 2003.
Copending U.S. Appl. No. 10/909,938, filed Aug. 2, 2004, entitled "Control Device fro Small Watercraft".
European Search Report; Sep. 7, 2006; two pages.

* cited by examiner

VEHICLE CONTROLLER FOR A STRADDLE TYPE VEHICLE

CROSS-REFERENCE TO RELATED APPLICATIONS

This application claims the priority under 35 U.S.C. § 119(a)-(d) of Japanese Patent Application No. 2005-148594, filed on May 20, 2005, which is hereby incorporated by reference in its entirety.

BACKGROUND OF THE INVENTION

1. Field of the Invention

The present invention generally relates to a vehicle controller for a straddle type vehicle. More particularly, the present invention relates to a vehicle controller provided with an antitheft function.

2. Description of the Related Art

For commonly used two-wheeled motor vehicles, engine start/stop and locking/unlocking of the steering have been performed by a mechanical key operation that involved inserting a key into a keyhole before key operation, which can be considered burdensome. Thus, a remote control system was proposed in which an owner of the vehicle would carry a portable transmitter (portable device) to transmit a signal to the vehicle to remotely control starting of the engine and unlocking of the steering system. This system would provide antitheft security by coding the signal transmitted to the vehicle and by authenticating the received encrypted signal with an authentication function installed on the vehicle.

Japanese Patent Document, JP-A-Hei 3-21575, disclosed a conventional authentication system. In this system, following successful authentication, a vehicle power circuit was switched-ON so that the engine could be started and so that the steering could be unlocked. An ignition switch and an unlocking switch could be manually operated once the power circuit was powered up and the two switches could start-up the engine and release the steering lock, respectively. In such a system, if authentication failed, the power circuit was not powered up. Thus, the engine would not start and the steering lock would not release the locked state. Thus, the system provided antitheft protection for the vehicle.

Japanese Patent Document, JP-A-Hei 6-247260, disclosed another authentication system. This system used a non-contact IC card. Upon successful authentication, the steering lock was released and the engine was able to be started. In this system, the engine enabling components and the steering lock release mechanism were all accommodated in a rigid steering lock unit, thereby preventing from engine start-up by an unauthenticated driver.

SUMMARY OF THE INVENTION

In the system described by Japanese Patent Document JP-A-Hei 3-21575, if authentication was successful, the engine start circuit and the unlock actuator, such as the steering lock, were able to be operated. But manual operation of the starting switch and manual operation of the release switch were necessary for engine start-up and release of the steering lock, respectively. Thus, in order to move the vehicle without starting the engine, such as during maintenance or the like, the steering lock must be manually operated to enable the vehicle to be steered after successful authentication. This manual unlocking can be burdensome, especially where several vehicles require movement.

In the system described by Japanese Patent Document JP-A-Hei 6-247260, if authentication was successful, the steering lock was released but the steering lock release was not controlled by the remote control. Thus, the system was less user-friendly than might be desired. In addition, locking of the steering lock was a manual operation, which removed the need for an enlarged actuator. Locking, however, was performed by rotary movement of a lever, which disadvantageously results in the need to provide adequate space for the range of lever movement.

One aspect of the present invention involves a vehicle controller for a straddle type vehicle comprising a steering lock release assembly, a portable device, a control unit and a code identification component. The portable device is adapted to transmit a code signal and the code identification component is adapted to authenticate the code signal by comparing the code signal to a reference. The control unit issues a release signal to actuate the steering lock release assembly upon successful authentication of the code signal and power is supplied from the control unit to a control section of a vehicle driving source upon successful authentication so that the vehicle driving source is able to be started.

Another aspect of the present invention involves a vehicle controller for a straddle type vehicle. The vehicle controller comprises a portable device adapted to transmit a code signal. A control unit comprises a receiving component that is adapted to receive the code signal. The control unit also comprises an identification component adapted to compare the code signal to a reference such that a match can be made to authenticate the code signal. Upon successful authentication of the code signal, the vehicle controller issues a signal to unlock a steering lock and supplies power to a control section of a vehicle driving source.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS

Figure 1:
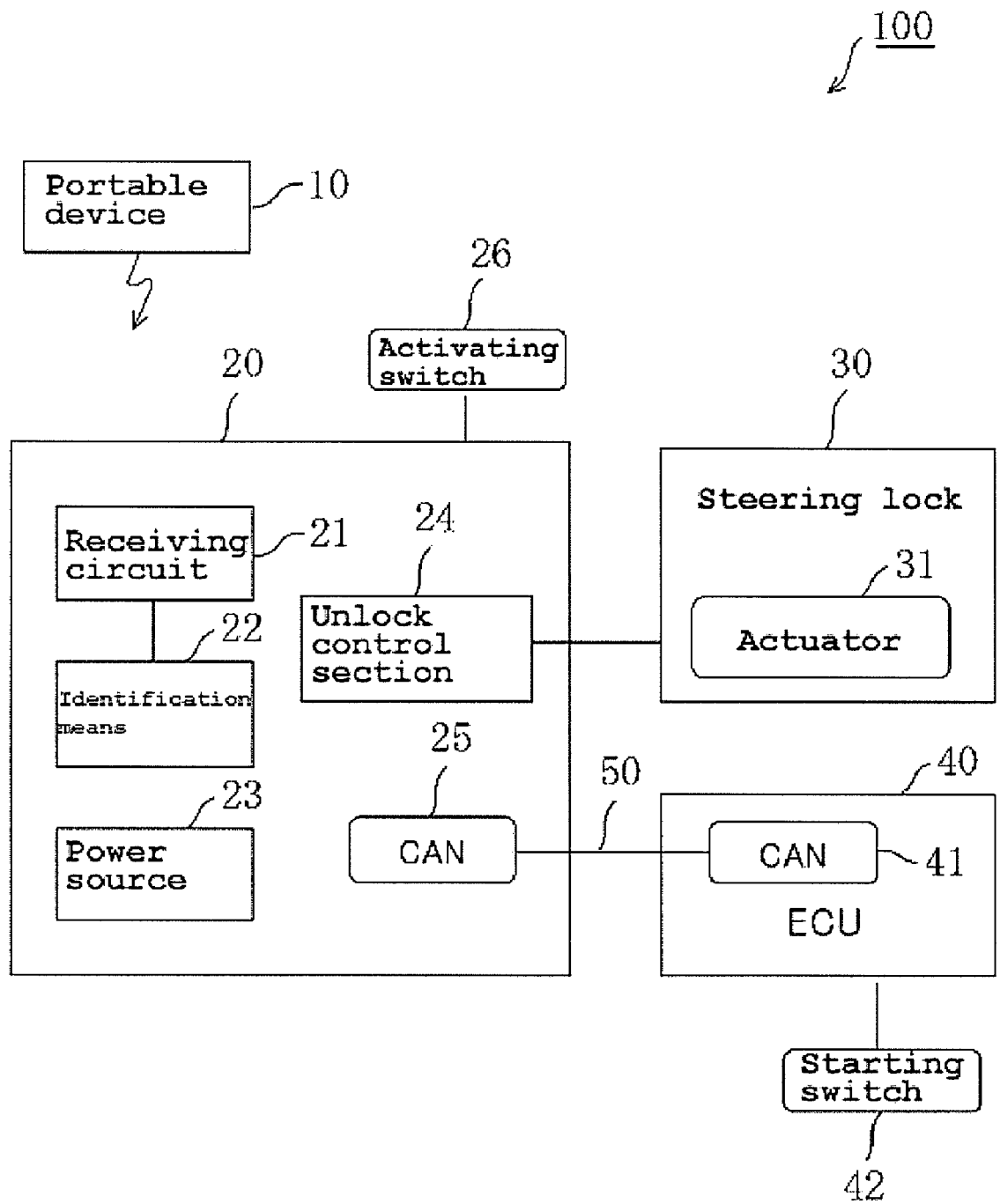
FIG. 1 is a block diagram illustrating a basic configuration of a vehicle controller for a two-wheeled motor vehicle, which vehicle controller is arranged and configured in accordance with certain features, aspects and advantages of the present invention.

Embodiments that are arranged and configured in accordance with certain features, aspects and advantages of the present invention are described below with reference to the drawings. In the drawings below, for the sake of simplifying explanation, components having substantially the same function are indicated with the same reference symbol. Further, the present invention is not limited to the following embodiments.

With reference initially to FIG. 1, a basic vehicle controller 100 is illustrated in block diagram form. Preferably, the controller 100 is arranged and configured for use in a two-wheeled motor vehicle.

The illustrated vehicle controller 100 comprises an authentication system that comprises a portable device 10, a receiving circuit 21 and a code identification component 22. The portable device 10 preferably is configured for carrying by a rider. The portable device is adapted to transmit a code signal. Any suitable portable device 10 can be used.

The receiving circuit 21 is installed in the vehicle and is adapted to receive the code signal transmitted by the portable device. The code identification component 22 also is installed in the vehicle and is adapted to identify the received code signal such that the vehicle controller 100 can authenticate whether or not a rider is an authorized rider, user or the owner of the vehicle. The receiving circuit 21 and the code identification component 22 can be implemented in the vehicle controller 100 or can be separate components, depending upon the desires reflected in the implementation.

In some configurations, the portable device 10 continuously (or intermittently) transmits the code signal. In other configurations, the vehicle controller 100, the receiving circuit 21 or any other suitable component issues a request signal that prompts the portable device to transmit the code signal. In some applications, the request signal is constantly or intermittently emitted. In one application, the request signal is transmitted from the vehicle when an activating switch 26 is operated and the portable device 10 transmits a code signal in response to the request signal. The code signal is processed to authenticate the signal such that the vehicle controller 100 can determine if the code signal matches the expected code signal.

Upon a successful code authentication, an unlock control section 24 of a control unit 20 issues a release signal to control a release actuator 31 of the steering lock 30. The actuator 31 releases the steering lock 30. Upon a successful code authentication, power also is supplied from the control unit 20 to an engine electronic control unit (ECU) 40, thereby allowing the engine to start-up or be enabled. In the illustrated configuration, the unlock control section 24 is installed in the control unit 20. Other arrangements are possible. Through the operation of the activating switch 26, a power source 23 of the control unit 20 is turned ON such that it is ready to supply power to the unlock control section 24.

The engine ECU 40 may communicate an encrypted signal with the control unit 20 via a communication line 50 to actuate or enable the engine ECU 40 when authentication of the encrypted signal is successful. The authentication system may be established by a commonly used controller area network (CAN) system or serial communication. In some applications, a secure wireless configuration can be used. Communication of the encrypted signal between the control unit 20 and the ECU 40 is conducted through operation of a starting switch 42 of the engine ECU 40. In one application, a vehicle driving source (e.g. electric motor or the like) also can be controlled by using the CAN system.

Figure 2:
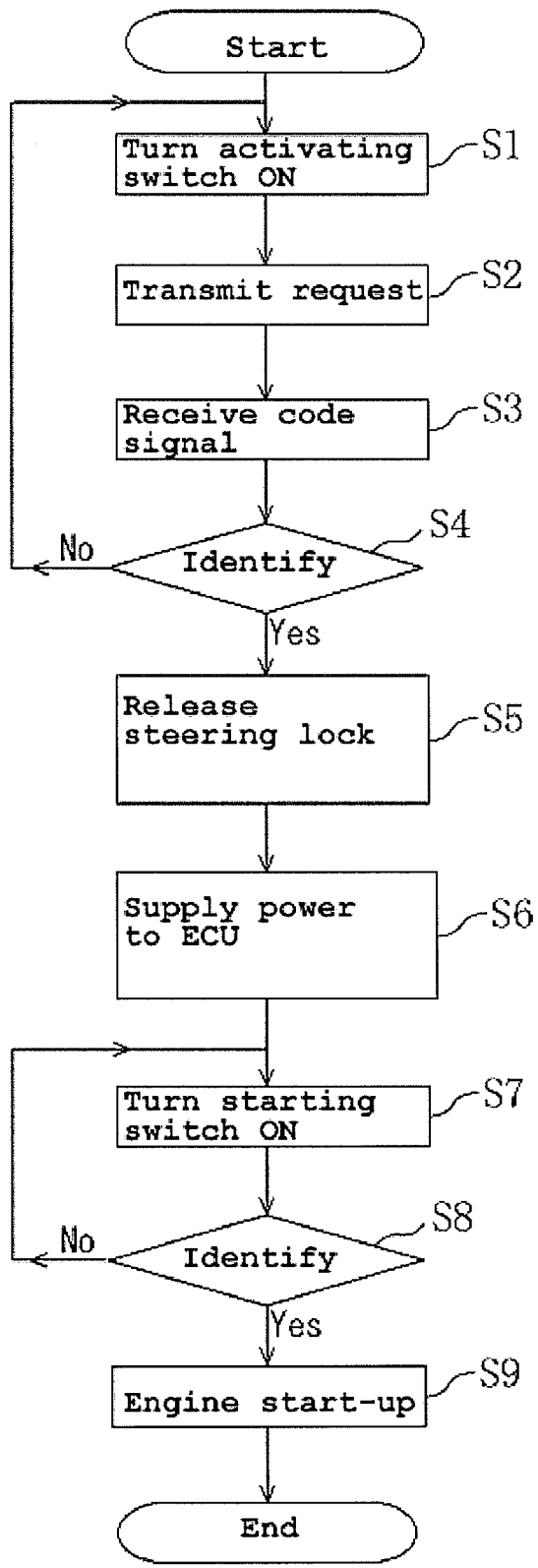
FIG. 2 is a flow chart illustrating a vehicle control method using the vehicle controller of FIG. 1.

With reference now to FIG. 2, a vehicle control method using the vehicle controller 100 of FIG. 1 will be described with reference to the flowchart of FIG. 2. Preferably, a rider presses the activating switch 26 provided on the vehicle (S1) to issue a request signal from a transmitter provided on the vehicle (S2). Upon reception of the request signal, the portable device 10, which the rider carries, sends a code signal back automatically. The receiving circuit 21 provided on the vehicle receives the code signal (S3) and identifies the signal with a specific reference code preset by the code identification component 22 (S4).

If the authentication succeeds, which means the rider has been identified as an authorized operator or owner of the vehicle, the control unit 20 issues a release signal to release the steering lock 30 (S5) while power is supplied from the control unit 20 to the engine ECU 40 (S6). These conditions allow the rider to move the vehicle, so that the rider can start vehicle inspection, maintenance or other work immediately. It should be understood that if the authentication fails, the steering lock 30 remains locked, thus providing antitheft protection for the vehicle. Also, releasing the steering lock (S5) and supplying power to the engine ECU (S6) can occur simultaneously or in the reverse order).

Next, when the rider is to start-up the engine to drive the vehicle, the rider presses a starting switch 42 of the engine (S7). Because the engine ECU 40 has been already supplied with power, communication of an encrypted signal between the control unit 20 and the engine ECU 40 via the communication line 50 is initiated with the operation of the starting switch 42 and the encrypted signal is identified (S8). If this second authentication succeeds, the engine ECU 40 is activated or enabled (S9), so that the vehicle can be started at anytime.

As described above, engine start-up is permitted by the authentication system using the CAN system. Accordingly, the CAN system protects the vehicle from unauthorized starting.

Figure 3:
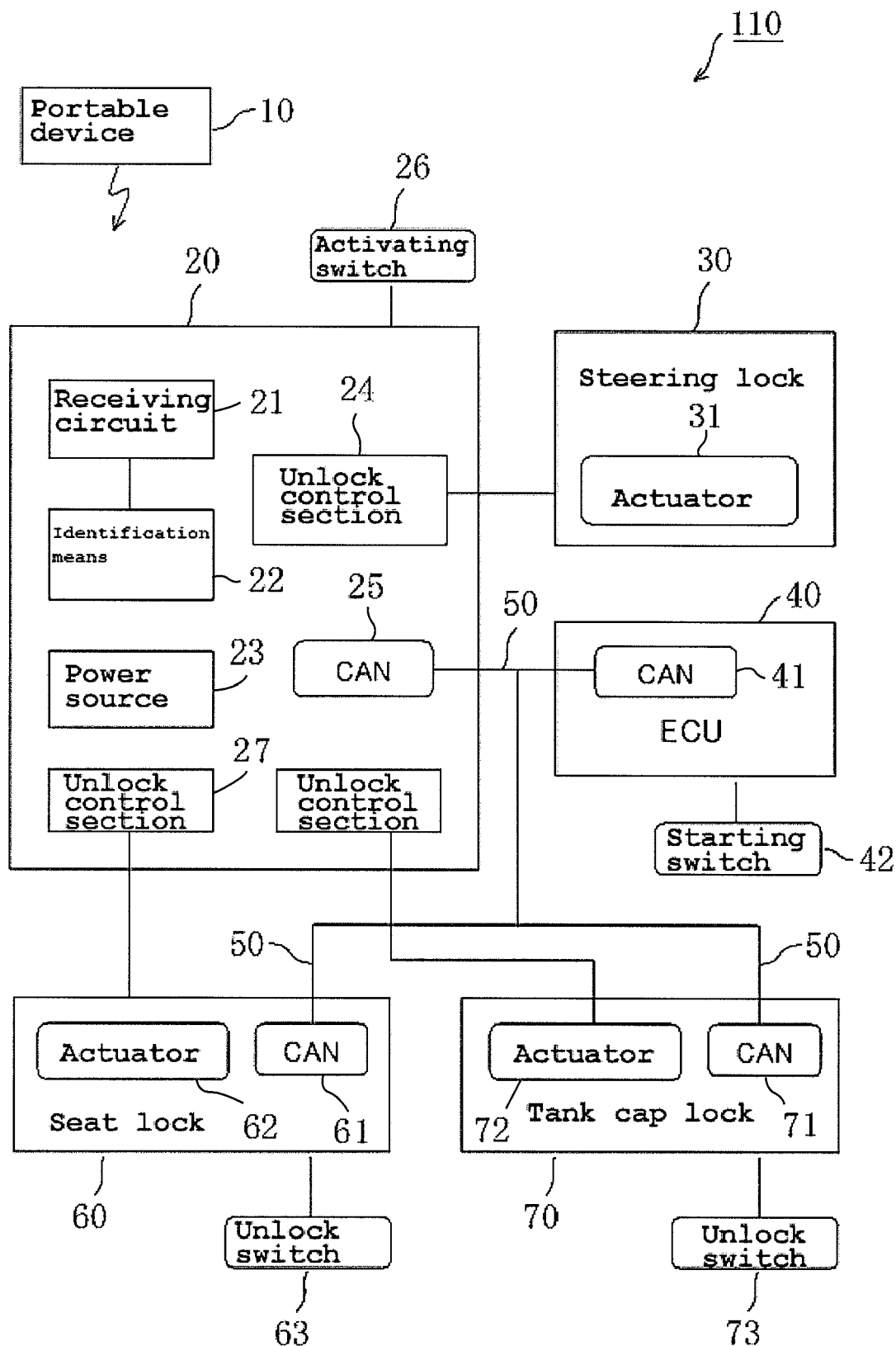
FIG. 3 is a block diagram illustrating a basic configuration of a vehicle controller for a two-wheeled motor vehicle, which vehicle controller is arranged and configured in accordance with certain features, aspects and advantages of the present invention.

With reference now to FIG. 3, another vehicle controller 110 is illustrated therein in a block diagram. The illustrated configuration comprises a portable device 10, a control unit 20, a steering lock 30 and an engine ECU 40. These components are essentially the same as the configuration shown in FIG. 1. Thus, the description of those components is not repeated.

A two-wheeled motor vehicle can be provided with other vehicle-mounted components that can be unlocked by an actuator, such as a seat lock and a fuel tank cap lock. Although these vehicle-mounted units, which can be locked/unlocked electrically, are convenient for a rider, there is a possibility that the units could be unlocked by an unauthorized individual such that items contained or protected by the units could be stolen or otherwise tampered with.

To overcome this problem, the authentication system using the CAN system, which is utilized for the engine ECU 40 as shown in FIG. 1, may also be applied for the vehicle-mounted units, such as the seat lock and the fuel tank cap lock, as a theft prevention measure. More specifically, as shown in FIG. 3, the seat lock 60 can comprise an actuator 62 that is used to unlock the seat. The seat lock 60 also can comprise a CAN 61 which acts as an authentication system. Pressing an unlock switch 63 allows communication of an encrypted signal between the CANS 25, 61 of the control unit 20 and of the seat lock 60 via a communication line 50 to identify the encrypted signal. In some applications, the encrypted signal can be transmitted in a wireless fashion; however, such a construction is less desirable from a security standpoint. If the authentication is successful, the unlock control section 27 actuates the actuator 62 to unlock the seat lock 60.

Similarly, for the fuel tank cap lock 70, identification of the encrypted signal between the CANS 25, 71 of the control unit 20 and of the tank cap lock 70 can be implemented via the communication line 50. Again, a wireless arrangement also can be used. If the authentication is successful, the unlock control section 28 actuates the actuator 72 to unlock the fuel tank cap lock 70.

Figure 4:
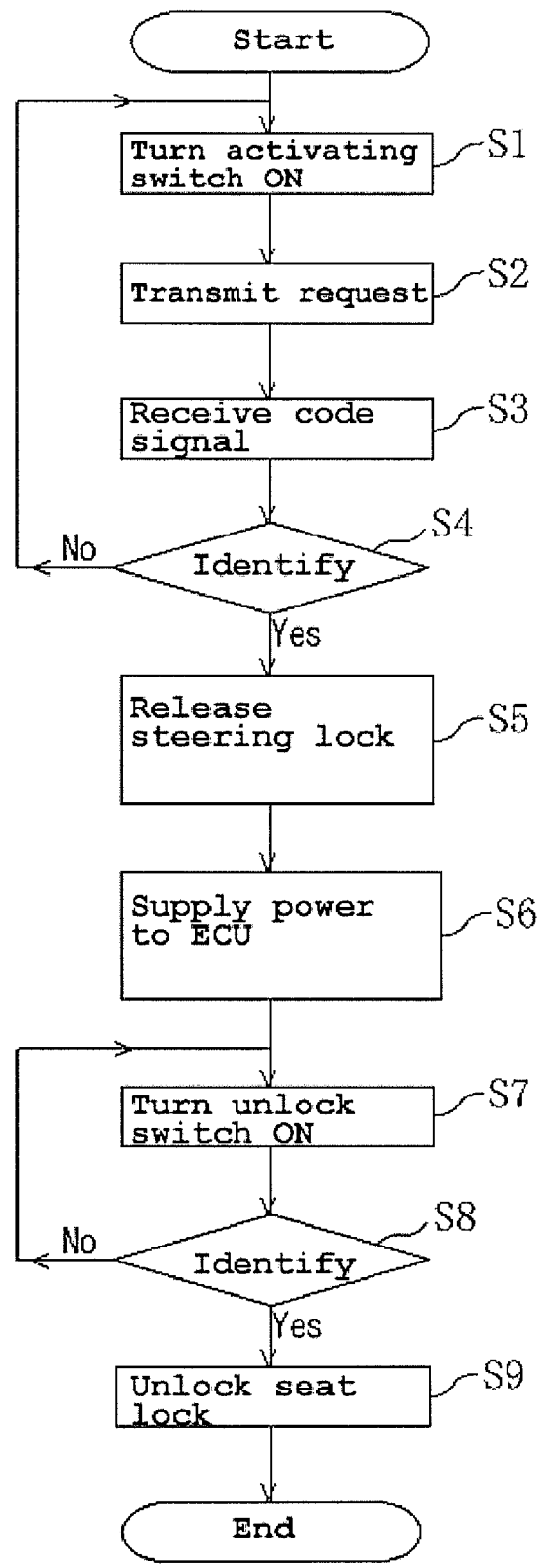
FIG. 4 is a flow chart illustrating a vehicle control method using the vehicle controller of FIG. 3.

With reference now to FIG. 4, a vehicle control method using the vehicle controller 110 of FIG. 3 will be described. In general S1-S6 occur in a manner such as that described above. Thus, detailed description thereof is not repeated.

In order to access items contained in the space under the seat, the unlock switch 63 of the seat lock 60 is pressed (S7). Because the power source 23 of the control unit 20 has already been turned ON, the CAN systems 25, 41 in the control unit 20 have been activated. Therefore, operation of the unlock switch 63 allows the control unit 20 and the seat lock 60 to transmit/receive an encrypted signal via the communication line 50 to identify the encrypted signal (S8).

When the authentication is successful, the seat lock 60 is unlocked (step S9) so that the items contained in the space under the seat can be taken out.

As described above, unlock of the seat lock 60 is permitted by the authentication system using the CAN system. Such a system reduces the likelihood of tampering due to the requirement for authentication. Thus, the seat is less likely to be opened by an unauthorized individual.

In a similar manner, in order to refuel the fuel tank, an unlock switch 73 of the tank cap lock 70 is pressed for identification using the CAN system between the control unit 20 and the tank cap lock 70. If the authentication is successful, the tank cap lock 70 is unlocked, allowing for refueling the fuel tank.

Figure 5:
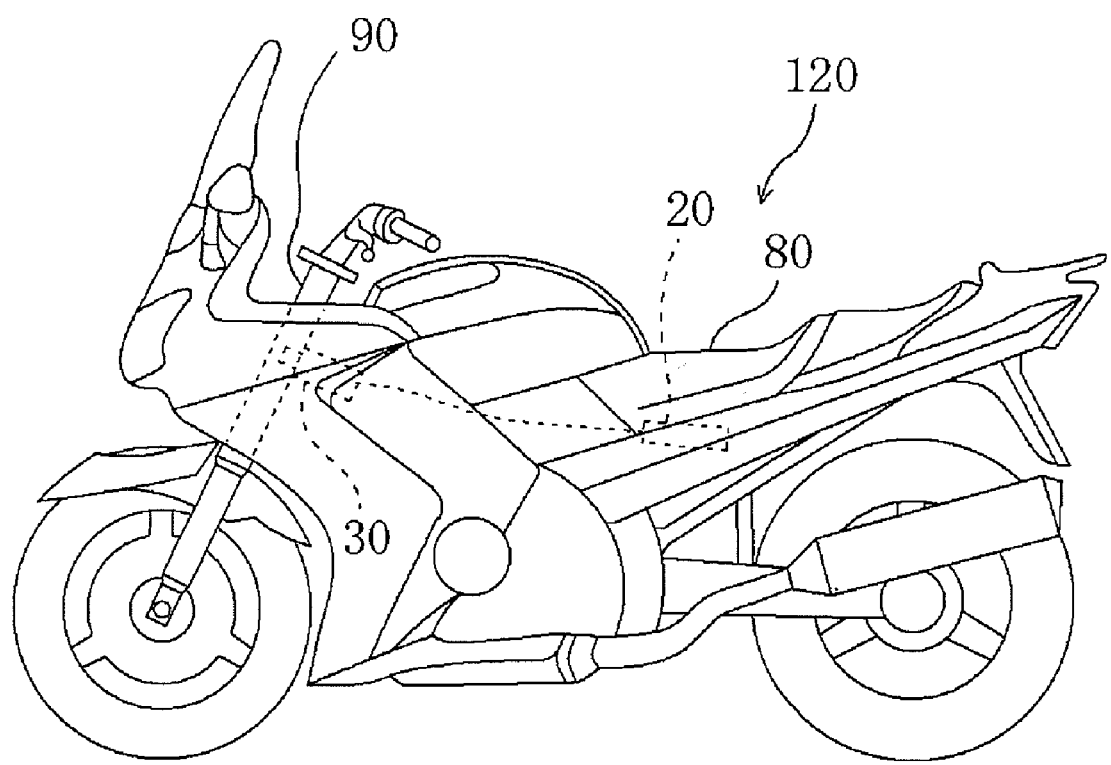
FIG. 5 illustrates an example in which the vehicle controller is mounted to a two-wheeled motor vehicle.

With reference to FIGS. 1 to 4, the vehicle controllers 100, 110 have been described for use in a two-wheeled motor vehicle. In turn, FIG. 5 illustrates an example in which either one of these vehicle controllers 100, 110 is installed on a two-wheeled motor vehicle 120.

In these vehicle controllers, the control unit 20 and the steering lock 30 may be handled as separately mounted, which can improve layout flexibility in the vehicle. In the example illustrated in FIG. 5, the control unit 20 is located below a seat 80 while the steering lock 30 is located adjacent to handlebars 90. The control unit 20 and the steering lock 30 are connected to each other via wiring. Other mounting locations and connections also can be used. In addition, the engine ECU 40 (not shown) may be handled as a separate configuration from the control unit 20, which allows the engine ECU 40 to be located at any position.

A starting switch 42 for actuating the engine ECU 40 and unlock switches 63, 73 for unlocking a seat lock 60 and a fuel tank cap lock 70, respectively, can be all connected to the control unit 20 via the communication line 50 that establishes the CAN system. These switches can be located in any desired location on the vehicle. For example, when a rider wants to start the engine, the rider operates the activating switch 26 to activate the authentication system, and then operates the starting switch 42 to start-up the engine. Thus, if these switches are combined into one mechanism, the ease of operation can be improved. To be more specific, a push-button switch may be adopted, which is designed to function as an activating switch with a short push or as a starting switch with a long push.

In addition, the unlock switches 63, 73 of the seat lock 60 and of the fuel tank cap lock 70 may be located adjacent to the seat and the fuel tank, respectively, or may be collectively located adjacent to the activating or starting switch.

The term "two-wheeled motor vehicle" used herein has its ordinary meaning and means motorcycles, including motorbikes and motor scooters, and, more particularly, comprises vehicles that can be turned by tilting the vehicle body. In addition, a vehicle equipped with two or more front wheels and/or two or more rear wheels, thus having three or four (or more) wheels in total may be defined as a "two-wheeled motor vehicle" for purposes of this application. Without any limitation to motorcycles, the present invention may also be applied to other vehicles, as long as a vehicle can take advantage of effects of the invention. Straddle type vehicles, such as four-wheeled buggies or all terrain vehicles (ATV) and snowmobiles, can include each of the aforementioned types of vehicles.

Although the present invention has been described in terms of certain embodiments and implementations, other embodiments and implementations apparent to those of ordinary skill in the art also are within the scope of this invention. Thus, various changes and modifications may be made without departing from the spirit and scope of the invention. For instance, various components may be repositioned as desired. For example, in the authentication system, a code signal is transmitted in response to a request signal. However, the vehicle may constantly issue a code signal without transmitting any request signal, or operation of a remote control alone (transmitting a signal from the portable device) may serve the purpose. Further, in the case where the container box is designed to be unlocked by the actuator, identification of an encrypted signal using the CAN system may be implemented to unlock the container box in the same manner as the case with the mechanism having the seat lock and fuel tank cap lock. Moreover, not all of the features, aspects and advantages are necessarily required to practice the present invention. Accordingly, the scope of the present invention is intended to be defined only by the claims that follow.

What is claimed is:

1. A vehicle controller for a straddle type vehicle comprising a steering lock release assembly, a portable device, a control unit and a code identification component, the portable device adapted to transmit a code signal, the code identification component adapted to authenticate the code signal by comparing the code signal to a reference, the control unit issuing a release signal to actuate the steering lock release assembly upon successful authentication of the code signal and power being supplied from the control unit to a control section of a vehicle driving source upon successful authentication so that the vehicle driving source is able to be started, the vehicle controller further comprising a vehicle-mounted unit and a related actuator, the actuator adapted to unlock the vehicle-mounted unit, an encrypted signal being communicated between the control unit and the vehicle-mounted unit, and if the encrypted signal is successfully authenticated, the actuator unlocks the vehicle-mounted unit.

2. The vehicle controller for a straddle type vehicle according to claim 1 further comprising an activating switch, the activating switch being electrically connected to the control unit, the vehicle controller adapted to issue a request signal upon operation of the activating switch, and the portable device transmitting the code signal in response to the request signal.

3. The vehicle controller for a straddle type vehicle according to claim 1, wherein an encrypted signal is communicated between the control unit and the control section of the vehicle driving source, and if authentication of the encrypted signal is successful, the vehicle driving source is able to be started.

4. The vehicle controller for a straddle type vehicle according to claim 1 further comprising an unlock switch adapted to unlock the vehicle-mounted unit, the encrypted signal being communicated between the control unit and the vehicle-mounted unit upon operation of the unlock switch associated with the vehicle-mounted unit.

5. The vehicle controller for a straddle type vehicle according to claim 1, wherein the vehicle driving source is selected from the group consisting of an engine and an electric motor.

6. The vehicle controller for a straddle type vehicle according to claim 1, wherein the vehicle-mounted unit is selected from the group consisting of a seat and a fuel tank.

7. The vehicle controller for a straddle type vehicle according to claim 1, wherein an encrypted signal between the control unit and the control section of the vehicle driving source is conducted upon operation of a starting switch that is in electrical communication with the control section of the vehicle driving source, and an activating switch and the starting switch are combined into one switch mechanism.

\* \* \* \* \*

UNITED STATES PATENT AND TRADEMARK OFFICE
CERTIFICATE OF CORRECTION

PATENT NO. : 7,554,217 B2  Page 1 of 1
APPLICATION NO. : 11/419395
DATED : June 30, 2009
INVENTOR(S) : Hitoshi Unno It is certified that error appears in the above-identified patent and that said Letters Patent is hereby corrected as shown below:

At column 2, page 1 (Other Publications), line 13, please delete "Saftey", and insert -- Safety --, therefor.

At column 2, page 2 (Foreign Patent Documents), line 4, please delete "150496 A", and insert -- 1504986 A --, therefor.

Signed and Sealed this

Twenty-third Day of February, 2010

David J. Kappos
*Director of the United States Patent and Trademark Office*